(12) United States Patent
Utermoehlen et al.

(10) Patent No.: US 11,125,585 B2
(45) Date of Patent: Sep. 21, 2021

(54) ROTATION ANGLE SENSOR SYSTEM, LIDAR SYSTEM, AND WORK DEVICE

(71) Applicant: Robert Bosch GmbH, Stuttgart (DE)

(72) Inventors: Fabian Utermoehlen, Leonberg (DE); Jan Sparbert, Rutesheim (DE); Remigius Has, Grafenau-Daetzingen (DE); Stefan Leidich, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 610 days.

(21) Appl. No.: 16/026,404

(22) Filed: Jul. 3, 2018

(65) Prior Publication Data
US 2019/0011290 A1    Jan. 10, 2019

(30) Foreign Application Priority Data
Jul. 6, 2017    (DE) .......................... 102017211493.2

(51) Int. Cl.
| | |
|---|---|
| G01D 5/20 | (2006.01) |
| H02J 50/10 | (2016.01) |
| G01S 7/481 | (2006.01) |
| G01S 17/931 | (2020.01) |

(52) U.S. Cl.
CPC ........... *G01D 5/2066* (2013.01); *G01D 5/202* (2013.01); *G01S 7/4817* (2013.01); *G01S 17/931* (2020.01); *H02J 50/10* (2016.02)

(58) Field of Classification Search
CPC ........ G01D 1/00; G01B 1/00; G01B 2210/00; G01P 1/00; G01R 1/00; H01F 1/00
See application file for complete search history.

(56) References Cited

U.S. PATENT DOCUMENTS

| | | | | |
|---|---|---|---|---|
| 9,059,649 | B1* | 6/2015 | Droz | ..................... H02P 6/16 |
| 2004/0032255 | A1* | 2/2004 | Berndt | ................ G01D 5/2073 |
| | | | | 324/207.25 |
| 2005/0030013 | A1* | 2/2005 | Terada | ................ G01D 5/2053 |
| | | | | 324/207.25 |
| 2005/0184726 | A1* | 8/2005 | Watanabe | ............. G01D 5/202 |
| | | | | 324/207.11 |

(Continued)

FOREIGN PATENT DOCUMENTS

| | | |
|---|---|---|
| CN | 104567651 A | 4/2015 |
| CN | 105164501 A | 12/2015 |

(Continued)

*Primary Examiner* — Jermele M Hollington
*Assistant Examiner* — Temilade S Rhodes-Vivour
(74) *Attorney, Agent, or Firm* — Norton Rose Fulbright US LLP; Gerard A. Messina

(57) ABSTRACT

A rotation angle sensor system for an optical system that includes a rotor and a stator, includes a stator-based coil system having an inductance and for generating and transmitting a magnetic alternating field, and a rotor-based target that functions as an eddy current element for receiving the magnetic alternating field and generating a magnetic eddy current field. The coil system and the target are mounted or mountable fixedly, with respect to rotation, on the stator and the rotor, respectively, in such a way that different overlaps and/or spatial proximities between the coil system and the target, with correspondingly different effects on the magnetic alternating field of the coil system, result as a function of the rotation angle and/or of the orientation between the stator and the rotor.

18 Claims, 4 Drawing Sheets

(56) References Cited

U.S. PATENT DOCUMENTS

2016/0091343 A1\* 3/2016 Lewerentz ........... G01D 5/2066
　　　　　　　　　　　　　　　　　　　　　324/654
2018/0154926 A1\* 6/2018 Ohira .................... G01D 5/244

FOREIGN PATENT DOCUMENTS

| CN | 106461782 A | 2/2017 |
| CN | 106796118 A | 5/2017 |
| CN | 106796119 A | 5/2017 |
| CN | 106796120 A | 5/2017 |
| CN | 106871937 A | 6/2017 |
| DE | 102015220615 A1 | 4/2017 |
| DE | 102015220617 A1 | 4/2017 |

\* cited by examiner

ROTATION ANGLE SENSOR SYSTEM, LIDAR SYSTEM, AND WORK DEVICE

CROSS-REFERENCE TO RELATED APPLICATIONS

The present application claims priority under 35 U.S.C. § 119 to DE 10 2017 211 493.2, filed in the Federal Republic of Germany on Jul. 6, 2017, the content of which is hereby incorporated by reference herein in its entirety.

FIELD OF THE INVENTION

The present invention relates to a rotation angle sensor system for an optical system that includes a rotor and a stator, and in particular for a LIDAR system, a LIDAR system per se, and a work device and in particular a vehicle.

BACKGROUND

In the use of work devices, vehicles, and other machines and equipment, operating assistance systems or sensor systems are increasingly being used for detecting the operating environment. In addition to radar-based systems or systems based on ultrasound, light-based detection systems such as so-called light detection and ranging (LIDAR) systems are also used.

For sampling or scanning LIDAR systems, primary light after being generated is led across a visual field to be detected. So-called macroscanners that include a rotor and a stator are used. The rotor accommodates at least a portion of the optical system, the sensor system, and the light sources, and is controllably rotatable relative to the stator with the aid of a drive. All components of the rotor are preferably supplied with energy wirelessly, starting from the stator. For the commutation of the drive and for the image reconstruction, information concerning the orientation of the rotor with respect to the stator and concerning its development over time are necessarily required for operating parameters to be determined, which thus far have had to be detected using a plurality of sensors.

SUMMARY

The rotation angle sensor system according to the present invention has an advantage over the related art that with comparably simple means, the orientation of a rotor with respect to a stator is reliably ascertainable at any time, even at the start of operation as an initial condition. This is achieved in that a rotation angle sensor system for an optical system that includes a rotor and a stator, and in particular for a LIDAR system, for determining a rotation angle and/or an orientation between the rotor and the stator is provided, which is designed (i) with a stator-based coil system, having an inductance (L), that is rotatably fixedly mounted or mountable on the stator as a sensor element for generating and transmitting a magnetic alternating field, in particular by active energization, and (ii) with a rotor-based target that functions as an eddy current element and is rotatably fixedly mounted or mountable on the rotor for receiving the magnetic alternating field and for generating a magnetic eddy current field, the coil system and the target being mounted or mountable on the stator and on the rotor, respectively, in such a way that different overlaps and/or spatial proximities between the coil system and the target, with a correspondingly different effect on the magnetic alternating field of the coil system, result as a function of the rotation angle and/or of the orientation between the stator and the rotor. The rotation angle and/or the orientation between the stator and the rotor can be deduced, based on the differing effect on the magnetic alternating field of the coil system, by measuring same.

The coil system of the rotation angle sensor system includes at least one coil element. However, a plurality of coil elements can also be provided.

According to various embodiments of the rotation angle sensor system according to the present invention, the coil element or the coil elements can have different designs. Thus, a respective coil element can be designed as a planar coil, a respective coil element in the section or cross section of a coil winding can have the shape of a circular segment or annular segment having a predefined opening angle, a respective coil element can be designed as part of an LC resonator, and for this purpose in particular includes first and second terminals that are connected or connectable to a capacitor, the coil system can include a plurality of coil elements which in particular are identical, are connected to one another in series, and/or uniformly cover a round angle, and/or the coil system can have a mirror-symmetrical or rotationally symmetrical design with respect to a rotational axis between the stator and the rotor.

According to the present invention, a different overlap and/or a proximity between the target on the one hand and the coil system as a sensor element on the other hand result(s) in different effects of the magnetic alternating field that is emitted by the coil system, in order to deduce information therefrom concerning a rotation angle and/or an orientation between the rotor and the stator.

Consequently, it is particularly advantageous when, according to another refinement of the rotation angle sensor system according to the present invention, the target includes at least one first, stronger electrically conductive section and a second, less strongly electrically conductive section, in particular in planar form in each case.

In particular, it can be provided that a respective first section of the target is electrically conductive and in particular is made of a metal, preferably aluminum, and a respective second section of the target is electrically insulating and in particular is formed from a gap and/or is made of an insulation material; a respective first section of the target, at least in a cross section perpendicular to a rotational axis between the stator and the rotor, is similar in shape and/or congruent to a, or to the, coil element(s) of the coil system; an identical plurality of first and second sections is formed which in each case are identical to one another, are identical as a whole, are in an alternating sequence, and/or uniformly cover a round angle; and/or the target has a mirror-symmetrical or rotationally symmetrical design with respect to a rotational axis between the stator and the rotor.

A particularly high level of detection accuracy results when the mutual influence between the target and the coil system is particularly high.

Thus, according to another advantageous example embodiment of the rotation angle sensor system according to the present invention, the coil system and the target are or become mounted or mountable on the stator and on the rotor, respectively, in such a way that the coil system and the target are situated in mutually parallel planes and/or at a small distance from one another, preferably at a distance of less than 5 mm, more preferably at a distance of less than 2 mm, and particularly preferably at a distance of less than 1 mm.

According to another refinement of the rotation angle sensor system according to the present invention, a particularly compact design results when the coil system is designed as a, or as part of, a stator-side circuit board structure.

Moreover, the present invention also relates to a LIDAR system for optically detecting a visual field and in particular for a work device and/or a vehicle. The LIDAR system according to the present invention is designed with a rotor, with a stator, with a device, in particular a drive, for rotating the rotor relative to the stator about a rotational axis, and with a rotation angle sensor system designed according to the present invention for determining a rotation angle and/or an orientation between the rotor and the stator, in which the coil system is rotatably fixedly mounted on the stator, and the target is rotatably fixedly mounted on the rotor.

In one advantageous refinement of the LIDAR system according to the present invention, the rotor and in particular a transmitter optical system of the rotor are configured with a light source unit and/or a receiver optical system with a detector system for wirelessly supplying energy, in particular with the aid of induction.

Furthermore, it is advantageous when for this purpose the stator includes a primary coil that is designed for generating and transmitting a magnetic alternating field, and the rotor includes a secondary coil that is designed for receiving the magnetic alternating field of the primary coil and for generating an induction voltage as the operating voltage, the primary coil and the secondary coil being magnetically coupled to one another, in particular it being possible to provide a ferrite element in each case in the magnetic coupling.

Under these circumstances, it is also advantageous when a ferrite element of the stator-side primary coil is provided below the coil system for the sensor element, or the stator-side primary coil and/or its support has/have a partially perforated design, and/or at least partially enclose(s) a ferrite element of the stator-side primary coil.

Additionally or alternatively, it can be provided that a ferrite element of the rotor-side secondary coil is structured for accommodating the target in a recess, and/or a materially modified area as a target, in particular in the form of an implant and/or a coating.

According to another aspect of the present invention, a work device and in particular a vehicle is provided, which is designed with a LIDAR system for optically detecting a visual field.

Specific embodiments of the present invention are described in greater detail with reference to the appended figures.

DETAILED DESCRIPTION

Figure 1:
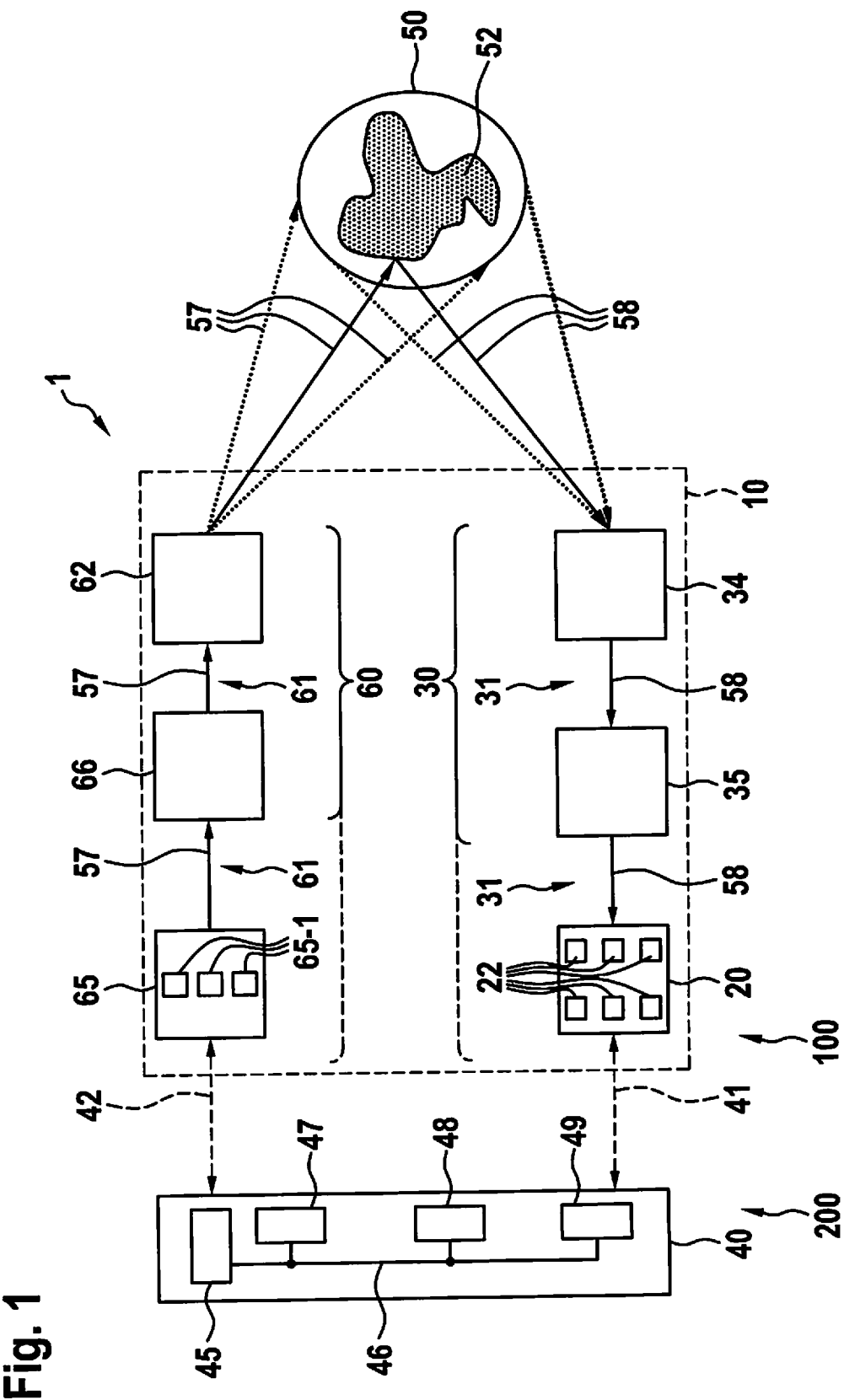
FIG. 1 is a schematic block diagram that shows the design of a LIDAR system according to an example embodiment of the present invention.

Exemplary embodiments of the present invention and the technical background are described in greater detail below with reference to FIGS. 1-5. Identical and equivalent elements and components as well as identically or equivalently functioning elements and components are denoted by the same reference numerals. A detailed description of the indicated elements and components is not always provided in every instance of their occurrence.

The described features and further properties can be considered separately in an arbitrary manner, and arbitrarily combined with one another, without departing from the core of the present invention.

FIG. 1 shows one specific embodiment of LIDAR system 1 according to an example embodiment of the present invention, together with an optical system 10, in the form of a schematic block diagram.

LIDAR system 1 according to FIG. 1 includes in its optical system 10 a transmitter optical system 60 with an optical path 61, which is fed by a light source unit 65 that includes light sources 65-1, for example in the form of lasers here, and which emits primary light 57, optionally after passing through a beam-shaping optical system 66 and across a deflection optical system 62, into a visual field 50 for detecting an object 52 situated at that location in a scene 53.

In addition, LIDAR system 1 according to FIG. 1 includes a receiver optical system 30 with an optical path 31 which receives secondary light 58 that is reflected from object 52 in visual field 50 via a lens 34 as a primary optical system, and transmits it via a secondary optical system 35 to a detector system 20 for detection with sensor or detector elements 22. Secondary optical system 35 can include a band pass filter in order to reduce the influence of scattered light.

The control of light source unit 65, which includes light sources 65-1, and of detector system 20 takes place via control channels 42 and 41, respectively, with the aid of a control and evaluation unit 40. Control and evaluation unit 40 can also take over the energy and/or data transmission between rotor 100 and stator 200, and in particular the control of a rotary drive. However, it is configured in particular, with the connection to transmitter unit 47, receiver unit 49, and correlation unit 48 via bus 46, to carry out the evaluation of visual field 50 via the control system.

It also emerges from FIG. 1 that control and evaluation unit 40 is provided in conjunction with stator 200, whereas optical system 10 of LIDAR system 1 is accommodated essentially in rotor 100.

The control of the operation of LIDAR system 1 according to the present invention according to FIG. 1 and the carrying out of a corresponding operating method take place using control system 45 illustrated in FIG. 1, in which transmitter unit 102, receiver unit 103, and correlation unit 104 are linked to one another via a bus 46, and are operatively connected to optical system 10 of LIDAR system 1 in rotor 100, and in particular to light source unit 65 of transmitter optical system 60 and detector unit 20 of receiver optical system 30, via control lines 41 and 42.

Figure 2:
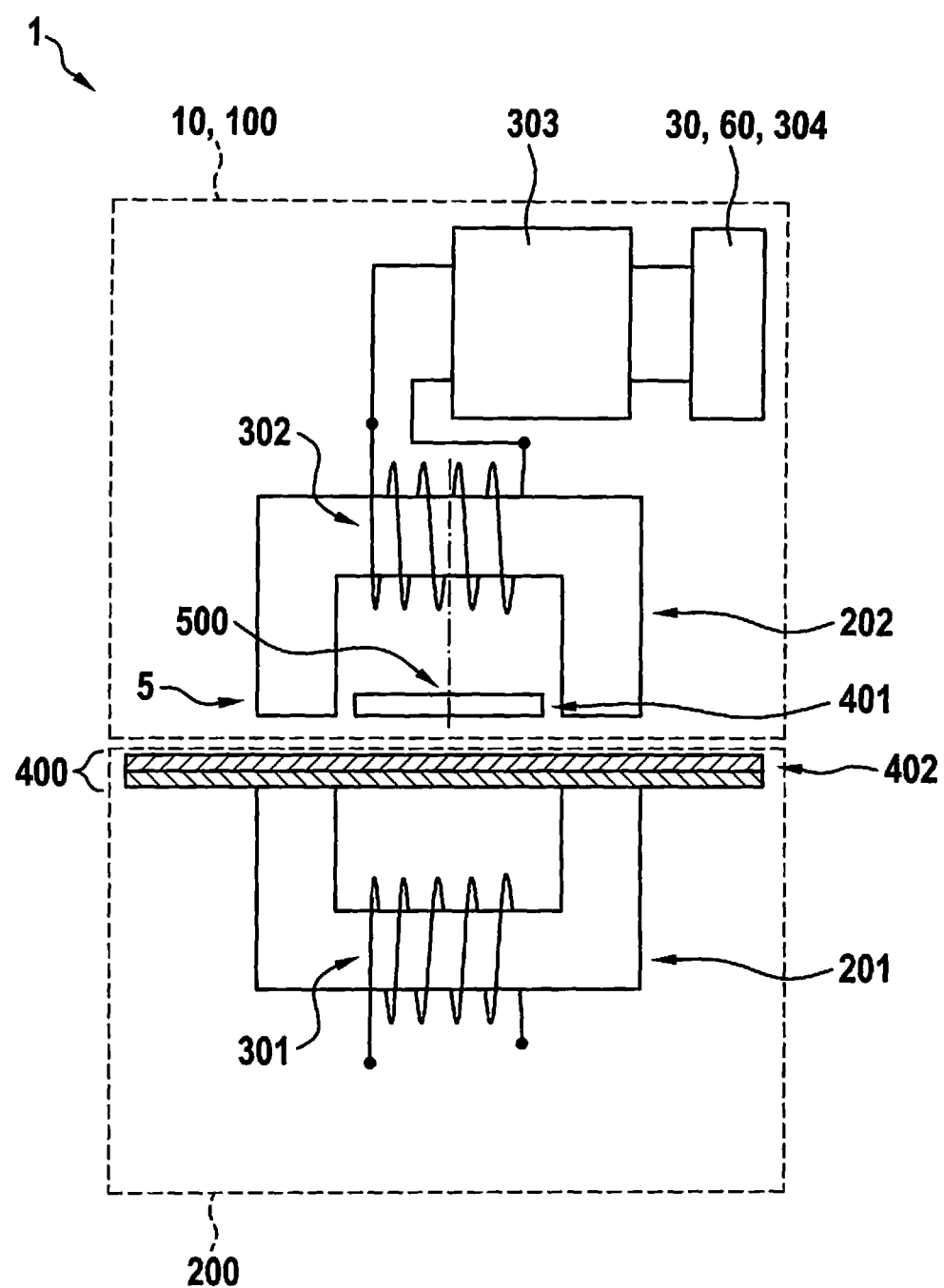
FIG. 2 shows, in a schematic and partially sectional side view, details of a LIDAR system using a rotation angle sensor system according to an example embodiment of the present invention.

FIG. 2, in a schematic and partially sectional side view, shows details of an example embodiment of LIDAR system 1 according to the present invention, using one specific embodiment of rotation angle sensor system 5 according to the present invention.

In the example embodiment according to FIG. 2, stator 200 includes, in addition to stator-side primary coil 301 with a ferrite element or ferrite core 201, a stator-side circuit board structure 400, which includes a coil system 402 as a sensor element in conjunction with determining the orientation of the rotation angle of rotor 100 relative to stator 200.

Rotor 100 includes, in addition to optical system 10 with transmitter optical system 60 and receiver optical system 30 and further elements 304 of LIDAR system 1, a secondary coil 302 with a ferrite element or ferrite core 202, the voltage induced in secondary coil 302 in a magnetic coupling with primary coil 301 and ferrite elements 201, 202 being supplied to a voltage converter 303 in order to generate an operating voltage for LIDAR components 304.

In the example embodiment according to FIG. 2, circuit board structure 400 together with coil system 402 is provided directly above ferrite element 201 of primary coil 301, and target 401, which functions as an eddy current element, is provided and situated near or in the direct proximity.

Rotor 100 is rotatable relative to stator 200 about a rotational axis 500, using a corresponding rotary drive, not illustrated here.

Figure 3:
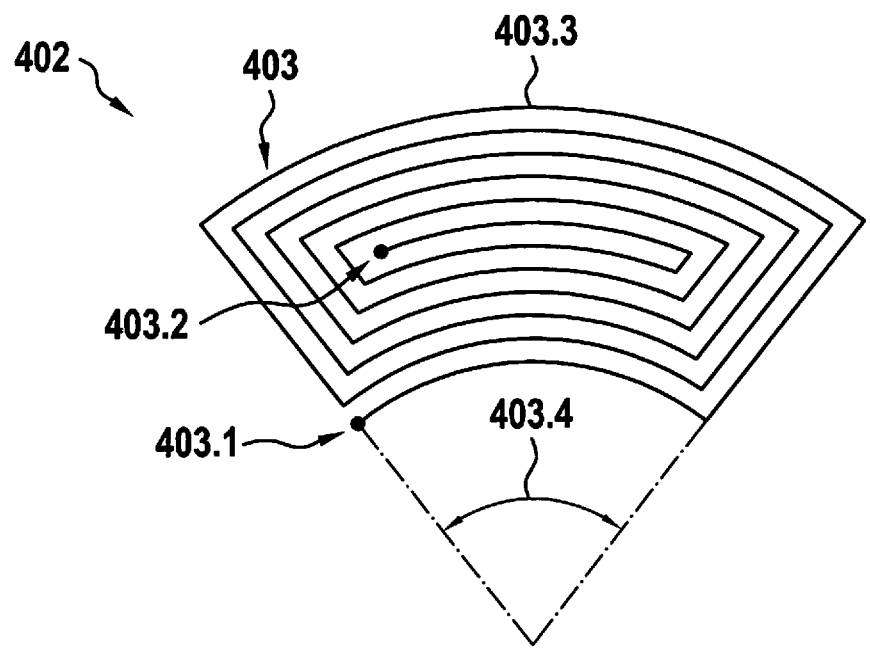
FIG. 3 shows a schematic top view onto a coil element of a coil system of the rotation angle sensor system according to an example embodiment of the present invention.

FIG. 3 shows a schematic top view onto a coil element 403 of a coil system 402 of an example embodiment of rotation angle sensor system 5 according to the present invention.

Coil element 403 of coil system 402 from FIG. 3, which is formed from an essentially planar coil with a winding 403.3, is situated here in a plane, which in the present case corresponds to the plane of the drawing. Winding 403.3 in this top view in FIG. 3 has the shape of an annular segment and defines terminals 403.1 and 403.2. Opening angle 403.4 of the annular segment is indicated.

In practice, a coil system 402 according to the present invention can include a plurality of such coil elements 403 which have identical annular segment shapes, and which, in particular in alternation with gaps, cover the round angle of 360°.

Figure 4:
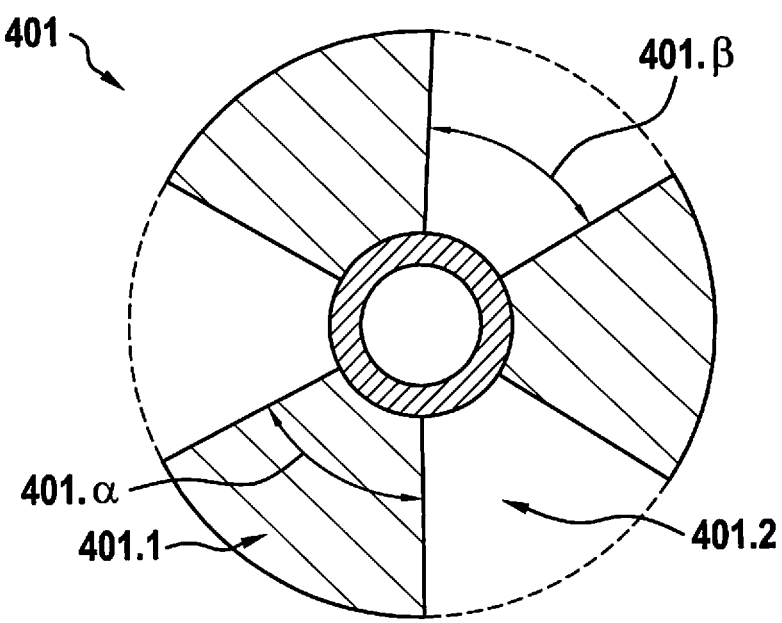
FIG. 4 shows a schematic top view onto a target of the rotation angle sensor system according to an example embodiment of the present invention.

FIG. 4 shows a schematic top view onto a target 401 in an example embodiment of rotation angle sensor system 5 according to the present invention.

Target 401 from FIG. 4 is made up of three first sections 401.1 in the form of circular segment elements having opening angles 401.α with gaps situated in between as second sections 401.2, and likewise in the form of circular segment elements having opening angles 403.β. For covering the round angle of 360°, opening angles 401.α and 401.β are dimensioned in such a way that triple their sum corresponds to exactly 360°.

Figure 5:
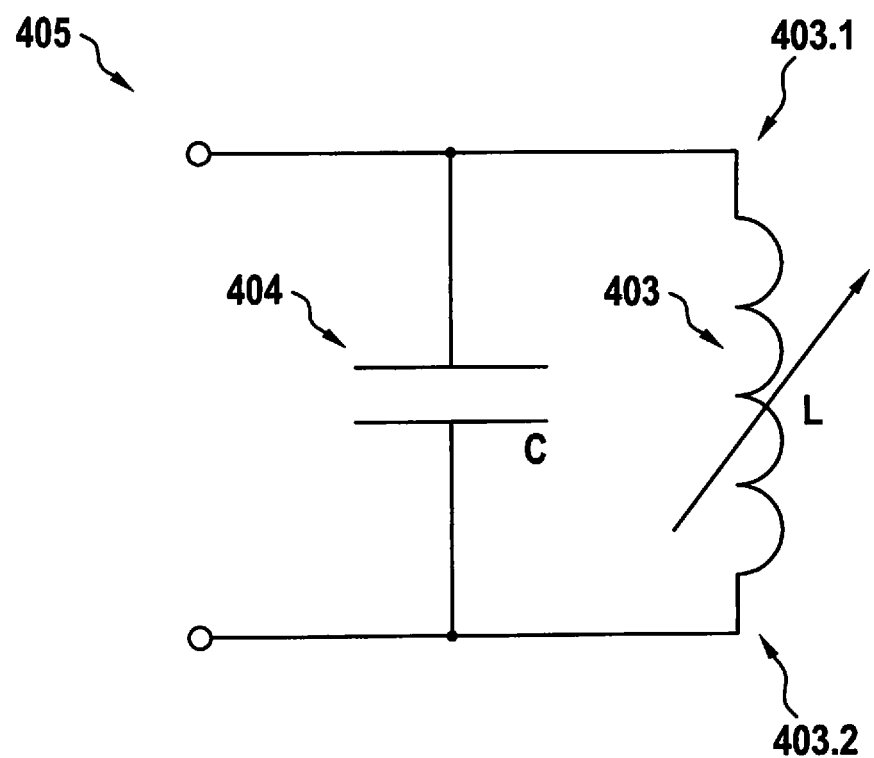
FIG. 5 shows an equivalent circuit diagram of a resonant circuit in conjunction with a coil element that is usable in an example embodiment of the present invention.

FIG. 5 shows an equivalent circuit diagram of a resonant circuit 405 in conjunction with a coil element 403 that is usable in an example embodiment of the present invention. Coil element 403, having an inductance L, is connected via its terminals 403.1 and 403.2 to the ends of a capacitor 404 having a capacitance C in order to form an LC resonator.

These and other features and properties of the present invention are explained in greater detail with reference to the following discussion.

In LIDAR technology, LIDAR macroscanners, for example, as LIDAR system 1 are used for systems that sample or scan the surroundings, in which all required optical elements of the optical system, as well as a laser as a light source 65-1 and detectors 21 of a detector system 20, rest on a rotor 100. However, scanners in which only one mirror rotates for the beam deflection can also be used.

In both cases, a beam of primary light 57 is emitted, using a pulsed light source 65-1, for example a laser, and its reflection is detected as secondary light 58, for example to carry out a distance measurement and record an "image" of scene 53, for example containing an object 52, from visual field 50 as the surroundings.

The rotating systems can be supplied with energy wirelessly, for example inductively via coils, or by using slip rings.

For commutating the motor and for computing the scene image, the position of rotor 100, in particular with respect to stator 200, must be known. For this purpose, two different sensors are sometimes used, a first sensor being used for commutating the motor and a second sensor being used for back-measuring the rotor position in order to compute the image.

The size of the required installation space and correspondingly high system costs are disadvantageous.

An object of the present invention is to achieve the integration of an inductive rotation angle sensor, in the sense of a rotation angle sensor system 5 according to the present invention, into ferrite elements 201, 202, which are provided anyway for wirelessly supplying energy, in order to transmit energy of the macroscanner as LIDAR system 1.

A significant feature of the present invention is the integration of an inductive rotation angle sensor, regarded as a rotation angle sensor system 5 according to the present invention, based on the eddy current effect, and components, namely, a rotor 100 and stator 200, of a LIDAR macroscanner as LIDAR system 1 which rotate in ferrite elements 201, 202 for wirelessly supplying energy.

This results in the following advantages, among others: a simplified design for LIDAR system 1 results; a lesser outlay of additional hardware for implementing the concept according to the present invention is necessary; the absolute position or absolute orientation of LIDAR system 1 can already be recognized during system start-up, which is important for motor commutation of the BLDC motor for the rotary drive; the energy transmission and the sensor signals do not interfere with each other; the sensor evaluation can take place using standard components, which is cost-effective due to the fact that no special ASIC is required; overall, a relatively easily implementable redundancy concept results; LIDAR system 1 according to the present invention is tolerance-robust and temperature-stable, i.e., a thermal expansion does not result in measuring errors; a very high sensitivity of LIDAR system 1 results; and the measuring principle followed according to the present invention is independent of outside influences such as humidity, and contaminants such as lubricants, etc.

FIG. 2 shows an example embodiment of LIDAR system 1 according to the present invention. A rotor 100 is illustrated in the figure, and is supported so that it is rotatable about a rotational axis 500. A stator 200, which is stationary and does not co-rotate with rotor 100, is situated opposite from rotor 100.

The components on rotor 100 are supplied with energy via a stator-side primary coil 301 which is acted on by an alternating voltage signal, for example in the frequency range of several tens of kHz to several hundred kHz, and which magnetically couples into a rotor-side secondary coil 302.

To ensure an effective transmission of energy, ferrite cores 201 and 202 are used on stator 200 and rotor 100, respectively.

On the secondary side of rotor 100, the alternating voltage can be rectified with a voltage converter 303 or further processed in some other way, for example by smoothing, by conversion to other frequencies or amplitudes, etc., in order to then supply other rotor-side components 304 of LIDAR system 1. These components are not further illustrated here, but can include light source 65-1 of a light source unit 65, such as a laser, and detector 21 of a detector system 20, and the like.

Also not illustrated are the necessary components for wireless data transmission between rotor 100 and stator 200, the motor for rotating the rotor, and the control system required for this purpose.

According to the present invention, stator 200 can include a circuit board structure 400 which carries or forms sensor coil elements 402, for example. Ferrite element 201 can either be situated below circuit board structure 400, as illustrated, or can at least partially enclose same.

It is also conceivable for circuit board structure 400 to include openings through which ferrite element 201 at least partially jacks through circuit board structure 400.

On the rotor side, LIDAR system 1 according to the present invention includes a so-called target 401. The target is used for the angle-dependent interaction with the magnetic field of primary coil 301 and the generation of eddy currents, which are then likewise angle-dependent, which can be detected on the stator side and which allow conclusions to be drawn concerning the position and/or orientation of target 401, and thus of rotor 100.

Target 401 has an electrically conductive design for generating eddy currents in some areas. This can involve, for example, a circuit board or a milled or punched part made of aluminum. In addition, it is possible to appropriately structure ferrite element 201 in order to insert an electrically conductive element as a target 401 into a recess at that location, or at least to provide the ferrite element with an electrically conductive coating or some other type of material component.

FIG. 3 shows an example of a coil structure 403 for stator-side sensor coil elements 402 in an example embodiment of LIDAR system 1 according to the present invention.

Circuit board structure 400, which carries or forms sensor coil elements 403 of coil system 402, includes at least one coil structure for coil element 403 according to FIG. 3. This is, for example, a planar coil in each case, which in the top view and in the cross section in the plane has an essentially annular segment shape. To increase the base inductance, coil system 402 and coil elements 403 can be provided in and integrated into multiple planes of a circuit board 400.

The underlying measuring effect is the change in inductance of planar coil 403 when an electrically conductive material, in the form of target 401, that generates eddy currents is situated above or moves across the planar coil. When an alternating voltage is applied to coil 403, this results in an electromagnetic alternating field that induces an eddy current in target 401. This eddy current generates a field that opposes the first field, which in a retroactive action results in a reduced inductance and in particular an oppositely directed induced voltage in sensor coil 403.

The greater the relative overlap between planar coil 403 and target 401, the greater the reduction in inductance and the oppositely directed induced voltage. The distance between target 401 and coil 403 should be preferably small, particularly preferably a few millimeters.

Multiple coil elements 403 can be provided and placed in an offset manner relative to one another to allow a more robust measurement of the rotation angle.

In the ideal case, six coil elements 403 of this type with an opening angle of 60° are used, which in the top view combine to form a full-circle annular element.

Oppositely situated coils 403 are particularly advantageously connected in series, so that a total of three pairs of coils 403 are to be evaluated.

FIG. 4 shows an example embodiment of a target 401 that is used according to the present invention. Target element 401 is preferably made up of a number of electrically conductive circular segment elements 401.1 that is identical to the number of coil elements 403, and electrically non-conductive or at least more poorly conductive circular segment elements 401.2.

The two circular segment elements 401.1 and 401.2 span angle 401.α and 401.β, respectively. Both angles 401.α and 401.β are preferably approximately equal, and approximately correspond to the opening angle of coil structure 403, for example according to FIG. 3.

The evaluation of the inductance for back-computing the rotation angle is based on a frequency measurement when coil element 403 with its terminals 403.1 and 403.2 is connected in an LC resonator 405 according to FIG. 5.

Accordingly, FIG. 5 shows a connection according to an example embodiment of the present invention of a coil element 403 in an LC resonator 405, in which a capacitor 404 with capacitance C and coil element 403 with inductance L are provided.

Resonant frequency $f_0$ of this LC resonator 405 is determined according to relationship (1):

$$f_0 = \frac{1}{2\pi \cdot \sqrt{L \cdot C}}. \tag{1}$$

The lower the coil inductance L, the greater the frequency $f_0$ of LC resonator 405.

Accordingly, a measurement of frequency f, for example by counting the periods within a defined time window, allows a conclusion concerning the rotation angle to be drawn.

Capacitance C of capacitors 404 is selected in such a way that a frequency f in the range of several tens of MHz results.

When multiple coils 403 having inductance L are used, the base frequencies without target 401 are preferably selected using different capacitors 404, with their capacitance C, in such a way that the base frequencies differ from one another by approximately 5 MHz.

Alternatively, coils 403 can be sequentially evaluated, with only one resonant circuit 405 active at a time. Otherwise, crosstalk of coils 403, which is no longer distinguishable from the measuring effect, can occur.

In a preferred example embodiment of LIDAR system 1 according to the present invention, the counting of the frequencies is taken over by motor control unit 40, which also takes over the motor commutation based on the rotation angle of the rotor.

What is claimed is:

1. A rotation angle sensor system for an optical system that includes a rotor and a stator, the rotation angle sensor system being for determining at least one of a rotation angle and an orientation between the rotor and the stator and comprising:
   a stator-based coil system having an inductance and that is, with respect to rotation, fixedly mounted or mountable on the stator as a sensor element for generating and transmitting a magnetic alternating field; and a rotor-based target that functions as an eddy current element and is, with respect to rotation, fixedly mounted or mountable on the rotor for receiving the magnetic alternating field and for generating a magnetic eddy current field;

wherein the mounting of the coil system and the target on the stator and on the rotor, respectively, is in a manner by which at least one of different overlaps and different spatial proximities between the coil system and the target, with correspondingly different effects on the magnetic alternating field of the coil system, result as a function of the at least one of the rotation angle and the orientation between the rotor and the stator, wherein:
the coil system includes at least one coil element; and
at least one of:
the at least one coil element includes a planar coil;
the at least one coil element includes a coil element in a section of a coil winding having the shape of a circular segment or the shape of an annular segment having a predefined opening angle;
the at least one coil element includes a coil element designed as part of an LC resonator with first and second terminals that are connected or connectable to a capacitor; and
the at least one coil element includes a plurality of identical coil elements that at least one of are connected to one another in series and uniformly cover a round angle.

2. The rotation angle sensor system of claim 1, wherein the coil system has a mirror-symmetrical or rotationally symmetrical design with respect to a rotational axis between the stator and the rotor.

3. The rotation angle sensor system of claim 1, wherein the target includes at least one first, stronger electrically conductive section and a second, less strongly electrically conductive section.

4. The rotation angle sensor system of claim 3, wherein the first and second conductive sections are planar sections.

5. The rotation angle sensor system of claim 3, wherein the first section of the target is electrically conductive and is made of a metal, and the second section of the target is electrically insulating is formed from at least one of a gap and an insulation material.

6. The rotation angle sensor system of claim 5, wherein the metal is aluminum.

7. The rotation angle sensor system of claim 3, wherein the first section of the target, at least in a cross section perpendicular to a rotational axis between the stator and the rotor, is at least one of similar in shape and congruent to a coil element of the coil system.

8. The rotation angle sensor system of claim 3, wherein at least one first section includes a plurality of identical first sections and the at least second section includes a plurality of identical second sections, and at least one of (a) the first sections alternate with the second sections and (b) uniformly cover a round angle.

9. The rotation angle sensor system of claim 3, wherein the target has a mirror-symmetrical or rotationally symmetrical design with respect to a rotational axis between the stator and the rotor.

10. The rotation angle sensor system of claim 1, wherein the coil system and the target are mounted or mountable on the stator and on the rotor, respectively, in such a way that the coil system and the target are situated at least one of in mutually parallel planes and at a small distance from each other.

11. The rotation angle sensor system of claim 1, wherein the coil system and the target are mounted or mountable on the stator and on the rotor, respectively, in such a way that the coil system and the target are situated at a distance of less than 5 mm from each other.

12. The rotation angle sensor system of claim 1, wherein the coil system and the target are mounted or mountable on the stator and on the rotor, respectively, in such a way that the coil system and the target are situated at a distance of less than 2 mm from each other.

13. The rotation angle sensor system of claim 1, wherein the coil system and the target are mounted or mountable on the stator and on the rotor, respectively, in such a way that the coil system and the target are situated at a distance of less than 1 mm from each other.

14. The rotation angle sensor system of claim 1, wherein the coil system is designed as a, or as part of a, stator-side circuit board structure.

15. The rotation angle sensor system of claim 1, wherein the optical system is a LIDAR system.

16. The rotation angle sensor system of claim 1, wherein the stator-based coil system is configured to generate the magnetic alternating field by active energization.

17. A LIDAR system for optically detecting a visual field for at least one of a work device and a vehicle, the system comprising:
a rotor;
a stator;
a drive for rotating the rotor relative to the stator about a rotational axis; and
a rotation angle sensor system for determining at least one of a rotation angle and an orientation between the rotor and the stator and including:
a stator-based coil system having an inductance and that is, with respect to rotation, fixedly mounted or mountable on the stator as a sensor element for generating and transmitting a magnetic alternating field; and
a rotor-based target that functions as an eddy current element and is, with respect to rotation, fixedly mounted or mountable on the rotor for receiving the magnetic alternating field and for generating a magnetic eddy current field;
wherein the mounting of the coil system and the target on the stator and on the rotor, respectively, is in a manner by which at least one of different overlaps and different spatial proximities between the coil system and the target, with correspondingly different effects on the magnetic alternating field of the coil system, result as a function of the at least one of the rotation angle and the orientation between the rotor and the stator, wherein, for inductive wireless energy supply:
the stator includes a primary coil that is designed for generating and transmitting a magnetic alternating field;
the rotor includes a secondary coil that is designed for receiving the magnetic alternating field of the primary coil and for generating an induction voltage as an operating voltage;
the primary coil and the secondary coil are magnetically coupled to each other, each of the primary and secondary coils being magnetically coupled to a ferrite element; and at least one of:
    transmitter optical system of the rotor is configured with a light source unit; and
    a receiver optical system of the rotor is configured with a detector system;
wherein at least one of:
the ferrite element of the primary coil is provided below the coil system for the sensor element;
a support of the primary coil at least one of has a partially perforated design and at least partially encloses the ferrite element of the primary coil;
the primary coil at least one of has a partially perforated design and at least partially encloses the ferrite element of the primary coil; and
the ferrite element of the secondary coil at least one of is structured for accommodating the target in a recess and includes a materially modified area, in the form of at least one of an implant and a coating, as a target.

18. A work device including a LIDAR system for optically detecting a visual field, the LIDAR system comprising:
    a rotor;
    a stator;
    a drive for rotating the rotor relative to the stator about a rotational axis; and
    a rotation angle sensor system for determining at least one of a rotation angle and an orientation between the rotor and the stator and including:
        a stator-based coil system having an inductance and that is, with respect to rotation, fixedly mounted or mountable on the stator as a sensor element for generating and transmitting a magnetic alternating field; and
        a rotor-based target that functions as an eddy current element and is, with respect to rotation, fixedly mounted or mountable on the rotor for receiving the magnetic alternating field and for generating a magnetic eddy current field;
    wherein the mounting of the coil system and the target on the stator and on the rotor, respectively, is in a manner by which at least one of different overlaps and different spatial proximities between the coil system and the target, with correspondingly different effects on the magnetic alternating field of the coil system, result as a function of the at least one of the rotation angle and the orientation between the rotor and the stator, wherein, for inductive wireless energy supply:
        the stator includes a primary coil that is designed for generating and transmitting a magnetic alternating field;
        the rotor includes a secondary coil that is designed for receiving the magnetic alternating field of the primary coil and for generating an induction voltage as an operating voltage;
        the primary coil and the secondary coil are magnetically coupled to each other, each of the primary and secondary coils being magnetically coupled to a ferrite element; and
    at least one of:
        transmitter optical system of the rotor is configured with a light source unit; and
        a receiver optical system of the rotor is configured with a detector system;
    wherein at least one of:
    the ferrite element of the primary coil is provided below the coil system for the sensor element;
    a support of the primary coil at least one of has a partially perforated design and at least partially encloses the ferrite element of the primary coil;
    the primary coil at least one of has a partially perforated design and at least partially encloses the ferrite element of the primary coil; and
    the ferrite element of the secondary coil at least one of is structured for accommodating the target in a recess and includes a materially modified area, in the form of at least one of an implant and a coating, as a target.

* * * * *